(12) United States Patent
Lin

(10) Patent No.: US 8,486,265 B2
(45) Date of Patent: Jul. 16, 2013

(54) STACKABLE MODULAR ULTRA PURE WATER MACHINE

(76) Inventor: Ying-Chen Lin, Hsinchu (TW)

(*) Notice: Subject to any disclaimer, the term of this patent is extended or adjusted under 35 U.S.C. 154(b) by 499 days.

(21) Appl. No.: 12/822,177

(22) Filed: Jun. 23, 2010

(65) Prior Publication Data

US 2011/0315615 A1    Dec. 29, 2011

(51) Int. Cl.
*C02F 1/44* (2006.01)
*C02F 9/00* (2006.01)

(52) U.S. Cl.
USPC ........ 210/239; 210/241; 210/257.1; 210/261; 210/262

(58) Field of Classification Search
USPC ................ 210/234–235, 260–261, 252, 142, 210/239, 240, 241, 262, 257.1
See application file for complete search history.

(56) References Cited

U.S. PATENT DOCUMENTS

| | | | |
|---|---|---|---|
| 6,120,682 A * | 9/2000 | Cook | 210/97 |
| 8,282,823 B2 * | 10/2012 | Acernese et al. | 210/236 |
| 2004/0129723 A1 * | 7/2004 | Meder et al. | 222/113 |
| 2012/0132573 A1 * | 5/2012 | Lautzenheiser et al. | 210/85 |

* cited by examiner

*Primary Examiner* — Terry Cecil
(74) *Attorney, Agent, or Firm* — Pai Patent & Trademark Law Firm; Chao-Chang David Pai (57) ABSTRACT

A stackable modular ultra pure water machine has at least one water tank module, at least one terminal processing module, at least one purification module, at least one water outlet module and a control module that connected together in a stack. The control module has an LED display and a faceplate. Therefore, it is convenient to add or remove modules with different functions to form a customizable ultra pure water machine.

5 Claims, 9 Drawing Sheets

STACKABLE MODULAR ULTRA PURE WATER MACHINE

BACKGROUND OF THE INVENTION

1. Field of the Invention

The present invention relates to an ultra pure water machine, and more particularly to a stackable modular ultra pure water machine having multiple modules with different functions to form customizable ultra pure water machines.

2. Description of the Prior Arts

Ultra pure water machines are widely used, especially in laboratories. Since water is required to be highly pure in laboratory work, for precision research projects and the ultra pure water machines can purify tap water into ultra pure water directly for research use. A conventional ultra pure water machine has a machine body connected securely to a water tank. The machine body contains multiple purifying elements therein such as pre-filters, booster pumps, reverse osmosis (RO) membranes, purification columns, ultraviolet (UV) lamps, ultrafiltration (UF) membranes and solenoid valves.

However, all the purifying elements are installed securely in the machine body and no space is reserved in the machine body to exchange purifying elements for different uses so a new ultra pure water machine with different purification effects must be purchased. Besides, when specific purifying elements are damaged and require repair, workers must take apart the whole machine body first, which is awkward and time wasting.

To overcome the shortcomings, the present invention provides a stackable modular ultra pure water machine to mitigate or obviate the aforementioned problems.

SUMMARY OF THE INVENTION

The main object of the present invention is to provide a stackable modular ultra pure water machine with modular purifying elements for convenient assembly and customization.

A stackable modular ultra pure water machine comprises at least one water tank module, at least one terminal processing module, at least one purification module, at least one water outlet module and a control module that connected together in a stack. The control module has an LED display and a faceplate. Therefore, it is convenient to add or remove modules with different functions to form a customizable ultra pure water machine.

Other objectives, advantages and novel features of the invention will become more apparent from the following detailed description when taken in conjunction with the accompanying drawings.

DETAILED DESCRIPTION OF THE PREFERRED ARRANGEMENTS

Figure 1:
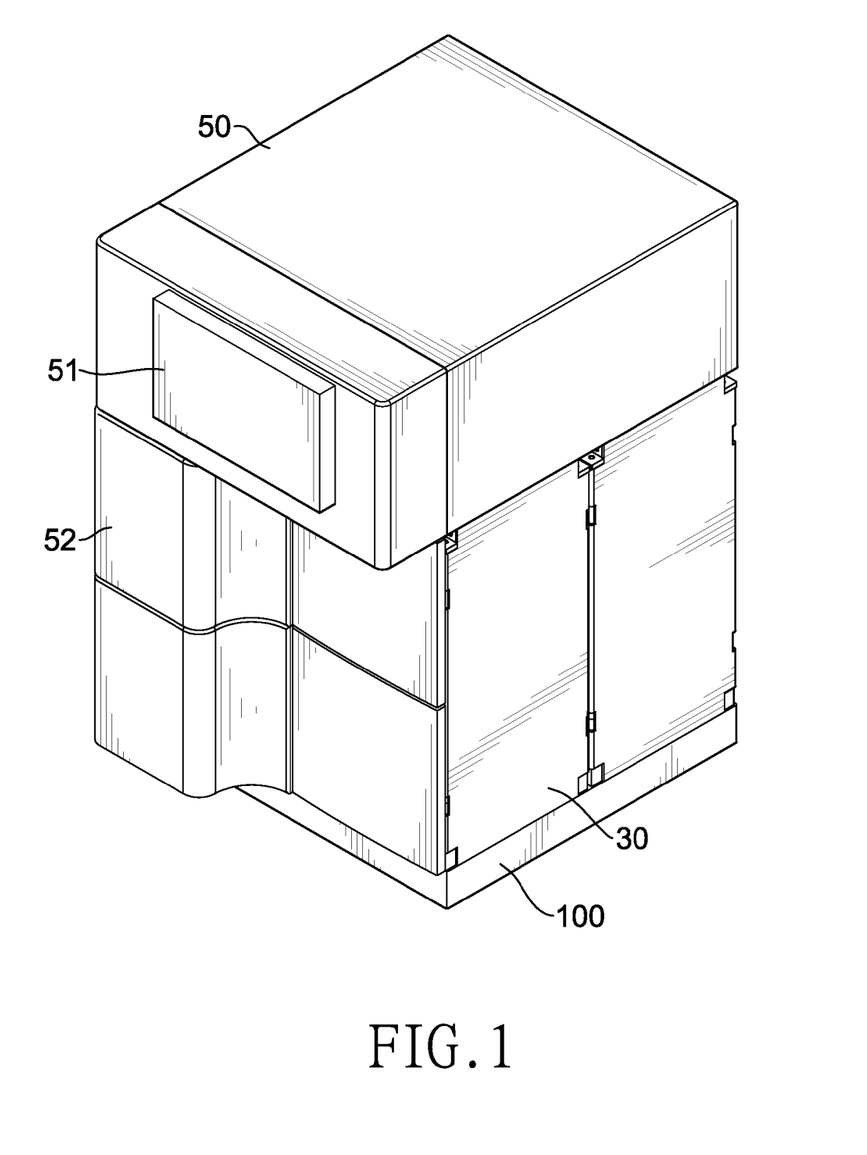
FIG. 1 is a perspective view of a first arrangement of a stackable modular ultra pure water machine in accordance with the present invention.
Figure 2:
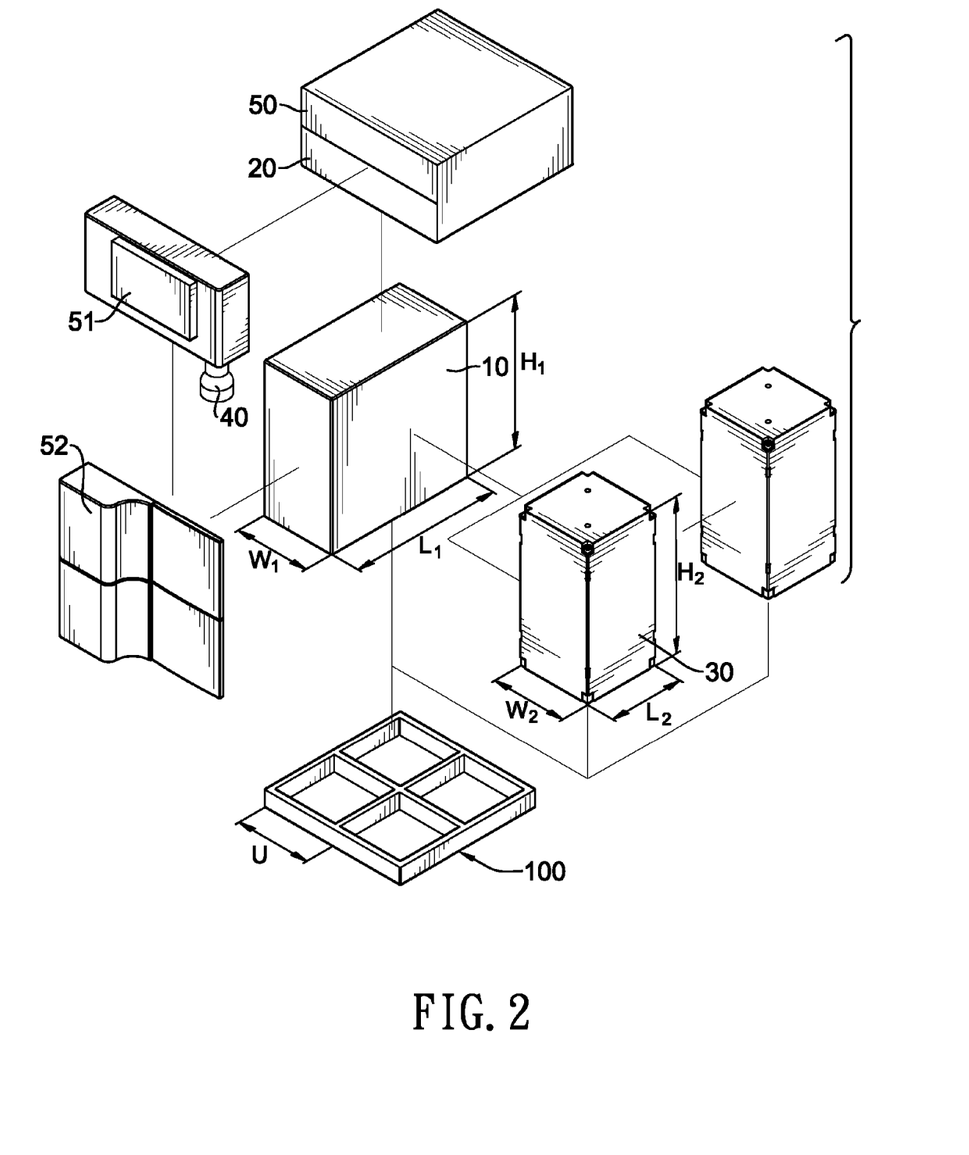
FIG. 2 is an exploded perspective view of the first arrangement of the stackable modular ultra pure water machine in FIG. 1.
Figure 3:
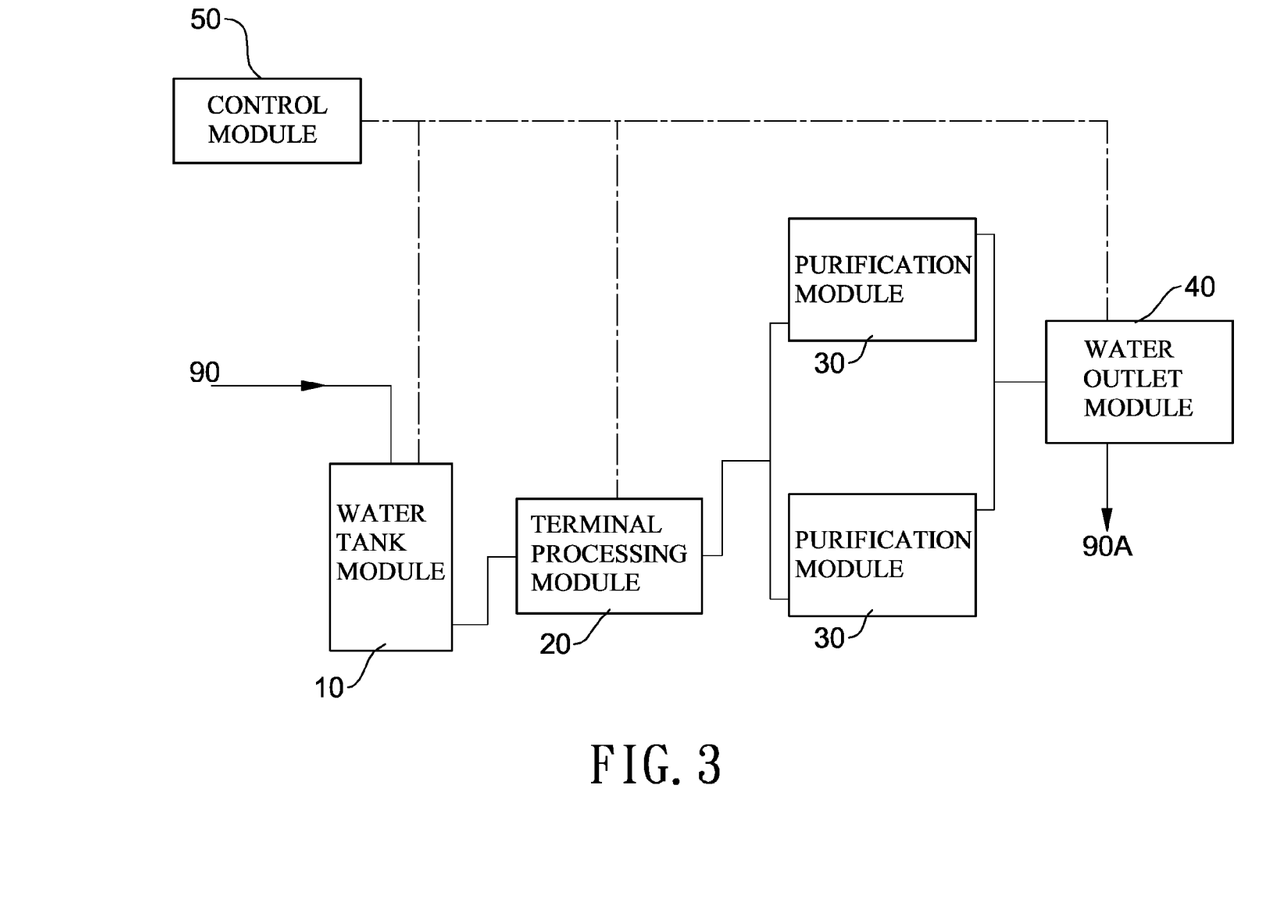
FIG. 3 is a flow diagram of the first arrangement of the stackable modular ultra pure water machine in FIG. 1.

With reference to FIGS. 1 to 3, a stackable modular ultra pure water machine in accordance with the present invention comprises a seat (100), at least one water tank module (10), at least one terminal processing module (20), at least one purification module (30) and at least one water outlet module (40) and may further comprise a control module (50).

The seat (100) is equally divided into multiple square units. The square units are arranged in a matrix, and each unit has a same unit side-length (U).

The at least one water tank module (10) is mounted on the seat (100). Each one of the at least one water tank module (10) has a length (L1), a width (W1) and a height (H1). The length (L1) of the water tank module (10) is equal to or integer multiple of the unit side-length (U). The width (W1) of the water tank module (10) is equal to or integer multiple of the unit side-length (U). The height (H1) of the water tank module (10) is equal to or integer multiple of the unit side-length (U).

The at least one terminal processing module (20) is connected to the at least one water tank module (10) by a pipeline and has pure water tanks, discharge pumps, UV lamps, UF filters, water inlet solenoid valves, loop solenoid valves, pure water outlet solenoid valves, ultra pure water outlet solenoid valves and low voltage switches that connected together by pipelines.

The at least one purification module (30) is connected to the at least one terminal processing module (20) by a pipeline and is composed of precision purification columns. Each one of the at least one purification module (30) has a length (L2), a width (W2) and a height (H2). The length (L2) of the purification module (30) is equal to or integer multiple of the unit side-length (U). The width (W2) of the purification module (30) is equal to or integer multiple of the unit side-length (U). The height (H2) of the purification module (30) is equal to or integer multiple of the unit side-length (U).

The at least one water outlet module (40) is connected to the at least one purification module (30) by a pipeline.

The control module (50) is connected to the water tank module (10), the terminal processing module (20) and the water outlet module (40) by circuits and has an LED display (51) and a faceplate (52) displaying information about the aforementioned modules.

Users can assemble the modules to form a customizable ultra pure water machine allowing different input water sources, such as tap water or distilled water. In a first arrangement, the ultra pure water machine comprises one water tank module (10), one terminal processing module (20), two purification modules (30) and one water outlet module (40). In operation, the first arrangement of the stackable modular ultra pure water machine uses distilled water (90). The distilled water (90) has been distilled to remove impurities, such as rust, silt, algae or organisms. The distilled water (90) enters the tank module (10) and then the control module (50) is operated to control the distilled water (90) to sequentially flow through the purification module (30) via the discharge pump of the terminal processing module (20) to exchange anions and cations by precision purification columns and finally produce ultra pure water from water outlet module (40). Therefore, the first arrangement of the ultra pure water machine allows distilled water (90) to be purified to produce ultra pure water (90A).

Figure 4:
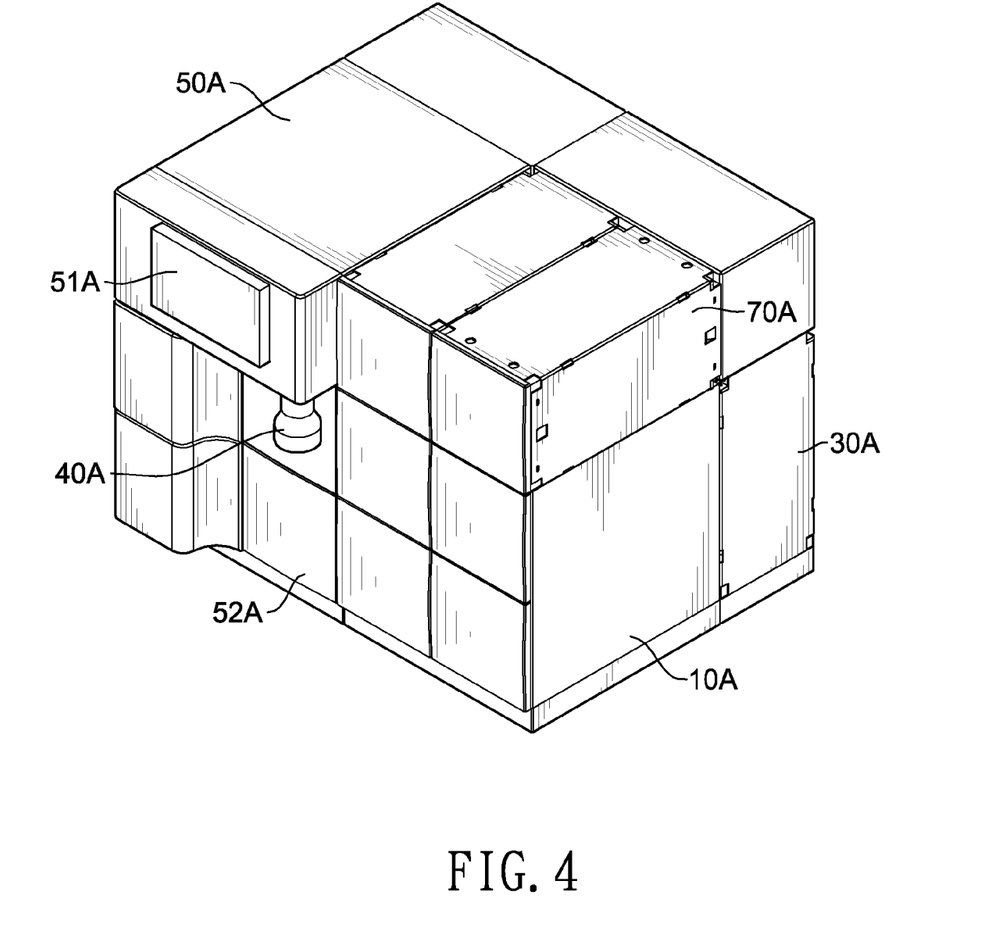
FIG. 4 is a perspective view of a second arrangement of the stackable modular ultra pure water machine in accordance with the present invention.
Figure 5:
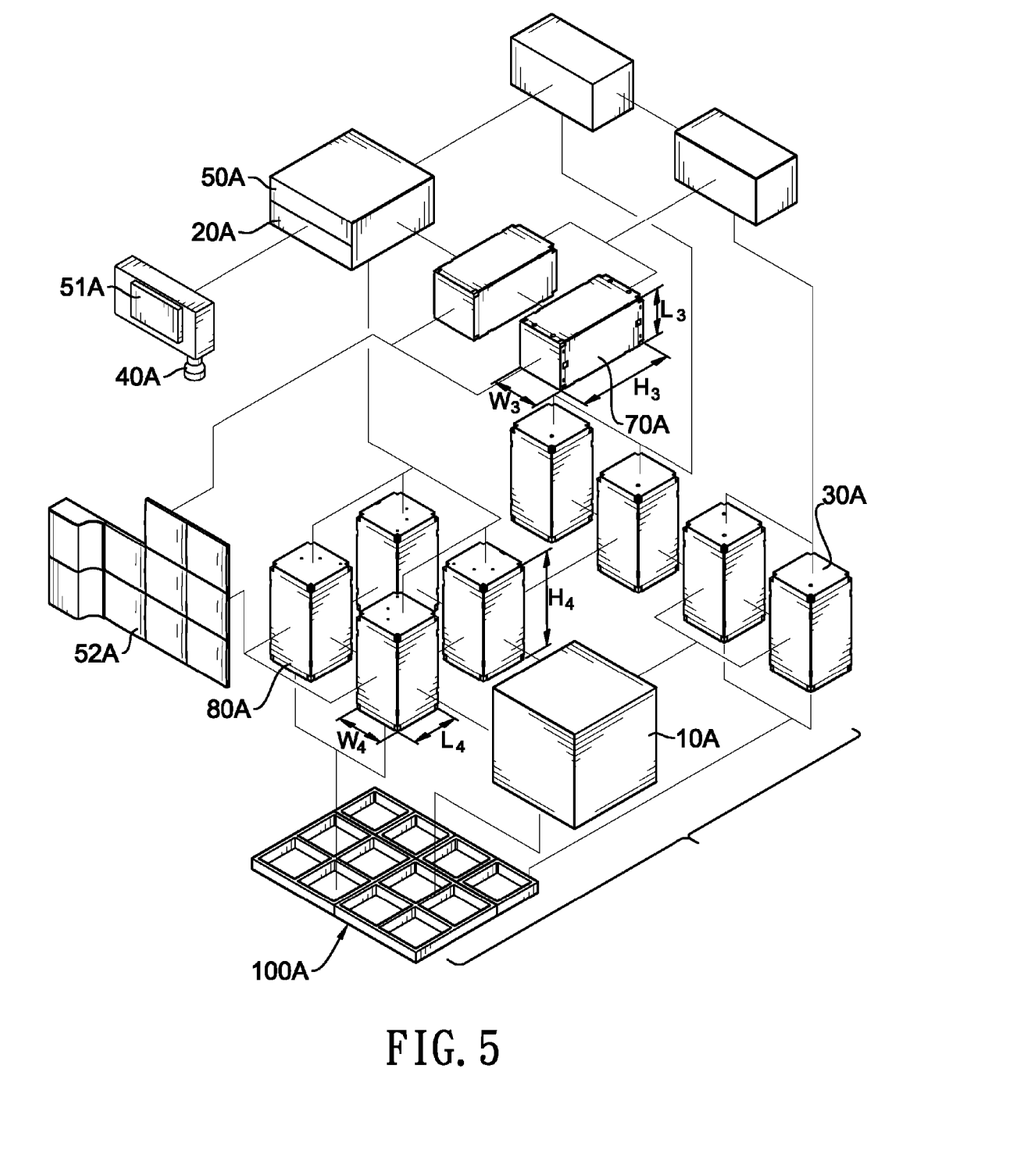
FIG. 5 is an exploded perspective view of the second arrangement of the stackable modular ultra pure water machine in FIG. 4.
Figure 6:
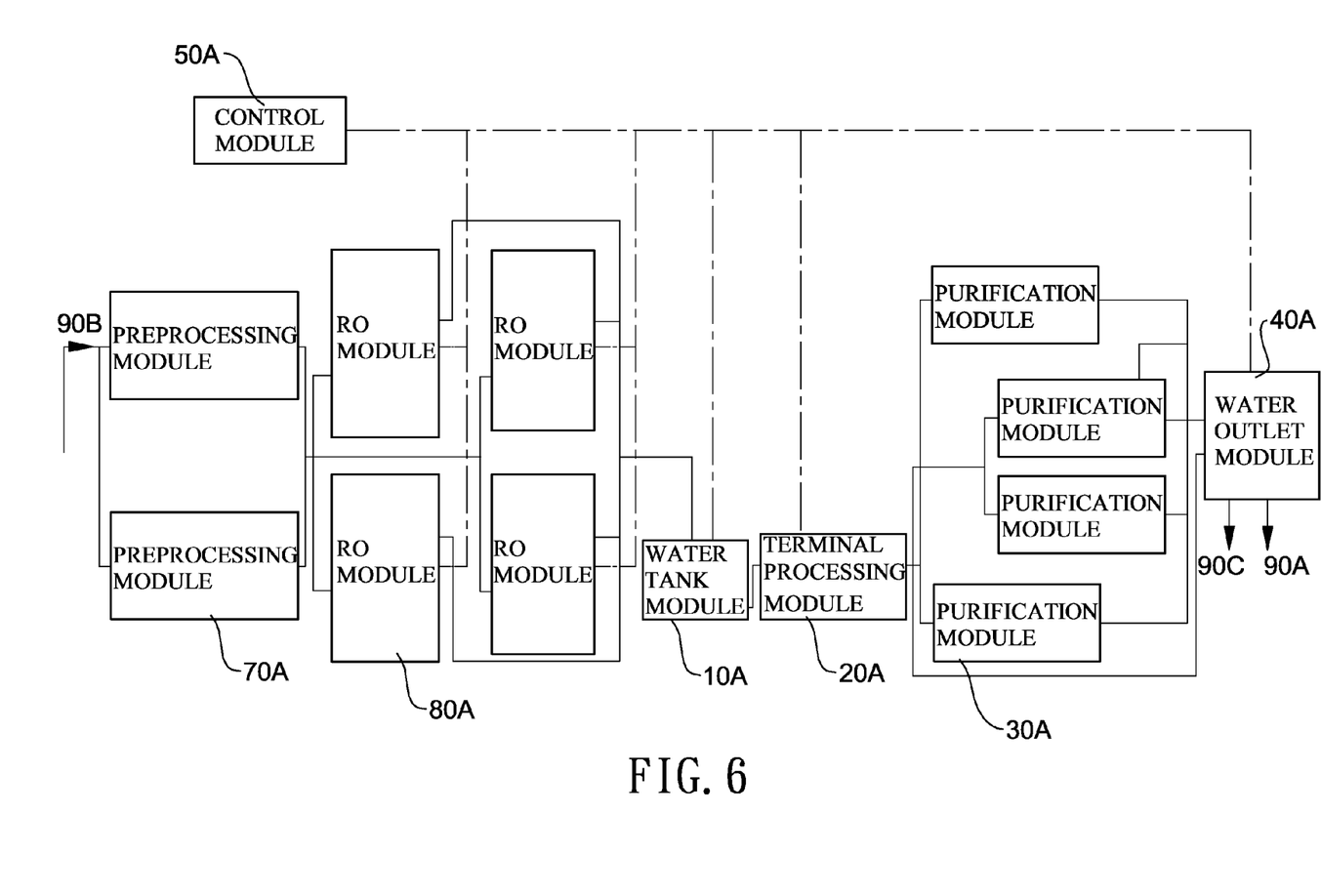
FIG. 6 is a flow diagram of the second arrangement of the stackable modular ultra pure water machine in FIG. 4.

With reference to FIGS. 4 to 6, the ultra pure water machine in accordance with the present invention further comprises at least one pretreatment module (70A) and at least one RO module (80A). The at least one water tank module (10A) is mounted on the seat (100A). The at least one pretreatment module (70A) has fiber filters connected to activated carbon filters. Each one of the at least one pretreatment module (70A) has a length (L3), a width (W3) and a height (H3). The length (L3) of the pretreatment module (70A) is equal to or integer multiple of the unit side-length (U). The width (W3) of the pretreatment module (70A) is equal to or integer multiple of the unit side-length (U). The height (H3) of the pretreatment module (70A) is equal to or integer multiple of the unit side-length (U). The at least one RO module (80A) is connected between the at the least one pretreatment module (70A) and the at least one water tank module (10A) by pipelines, connected to the control module (50A) by a circuit and has booster pumps, RO membranes, concentrated water regulating valve and RO rinse solenoid valve connected together by pipelines. Each one of the at least one RO module (80A) has a length (L4), a width (W4) and a height (H4). The length (L4) of the RO module (80A) is equal to or integer multiple of the unit side-length (U). The width (W4) of the RO module (80A) is equal to or integer multiple of the unit side-length (U). The height (H4) of the RO module (80A) is equal to or integer multiple of the unit side-length (U).

In a second arrangement, the ultra pure water machine comprises two pretreatment module (70A), four RO module (80A), one water tank module (10A), one terminal processing module (20A), four purification modules (30A) and one water outlet module (40A) sequentially connected to each other in a stack by pipelines and further comprising one control module (50A). The control module (50A) is connected to the RO module (80A), the water tank module (10A), the terminal processing module (20A) and the water outlet module (40A) by circuits and has an LED display (51A) and a faceplate (52A).

In operation, the second arrangement of the stackable modular ultra pure water machine allows tap water (90B) to enter. The tap water (90B) sequentially enters the pretreatment modules (70A) to remove impurities by the fiber filters and the activated carbon filters, flows through the RO modules (80) to leach bacteria, viruses, inorganic salts, pesticides or carcinogens and then flows into the tank module (10A). Subsequently, the water flows out from the tank module (10A) and enters the terminal processing module (20A) to produce pure water (90C) from the water outlet module (40A), or enters the terminal processing module (20A) and purification modules (30A) for further purification to produce ultra pure water (90A) from the water outlet module (40A). Therefore, the second arrangement of the ultra pure water machine allows tap water (90B) to be purified to produce pure water (90C) or ultra pure water (90A).

Figure 7:
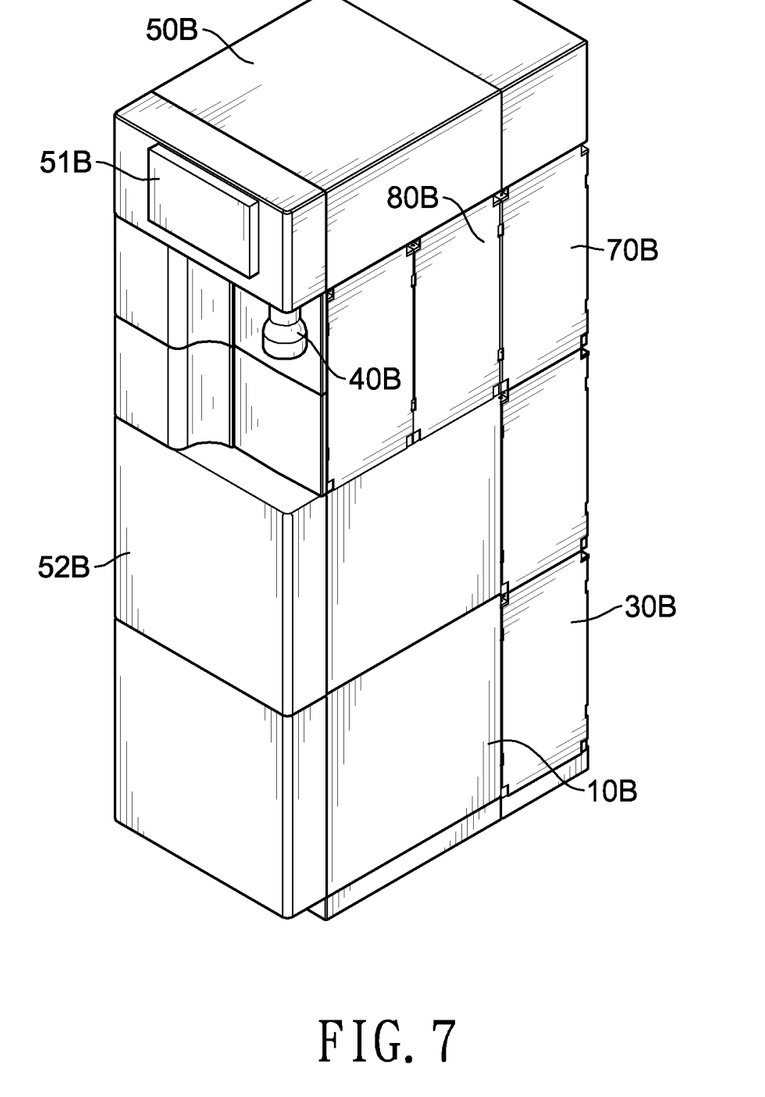
FIG. 7 is a perspective view of a third arrangement of the stackable modular ultra pure water machine in accordance with the present invention.
Figure 8:
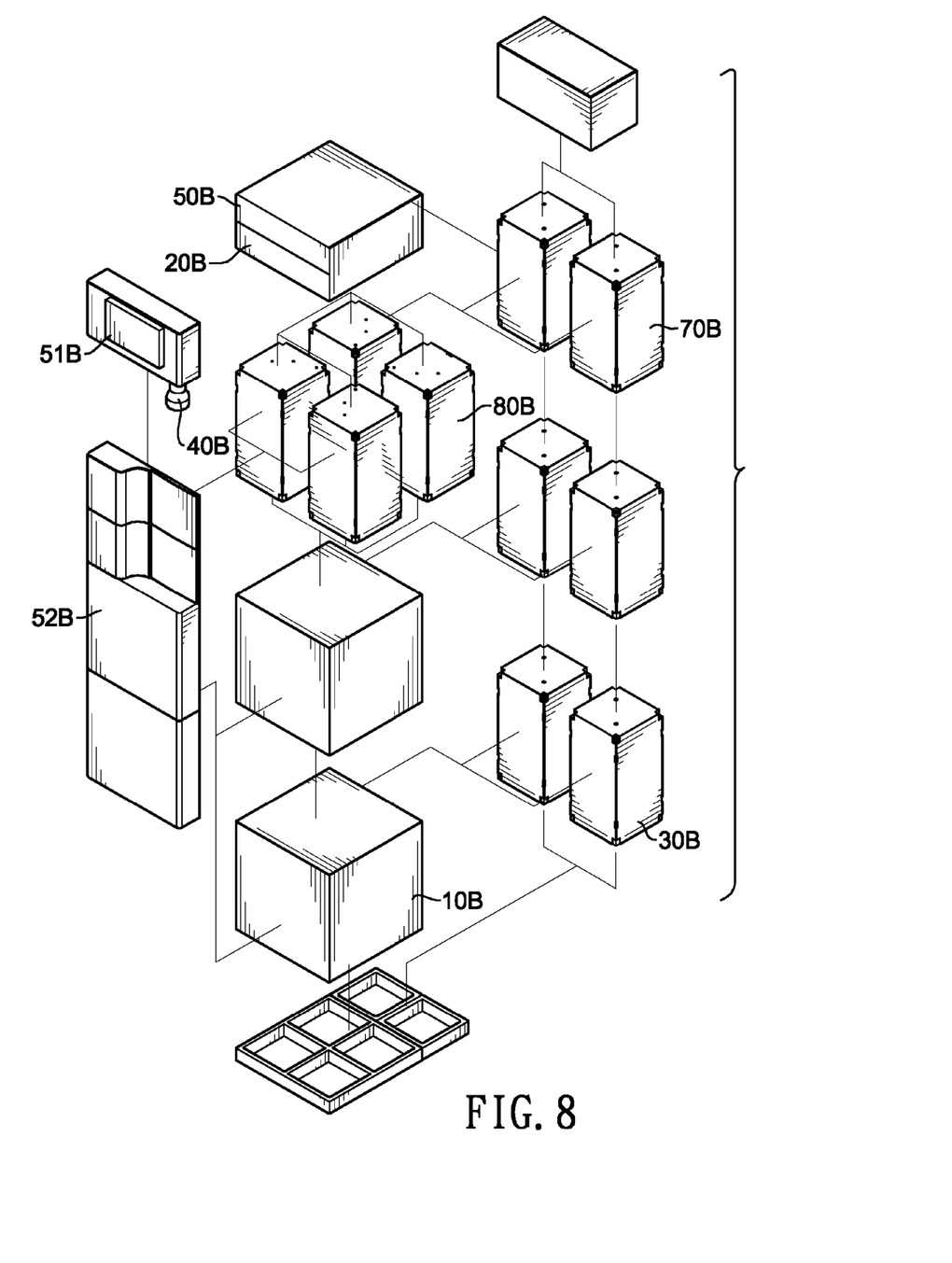
FIG. 8 is an exploded perspective view of the third arrangement of the stackable modular ultra pure water machine in FIG. 7.
Figure 9:
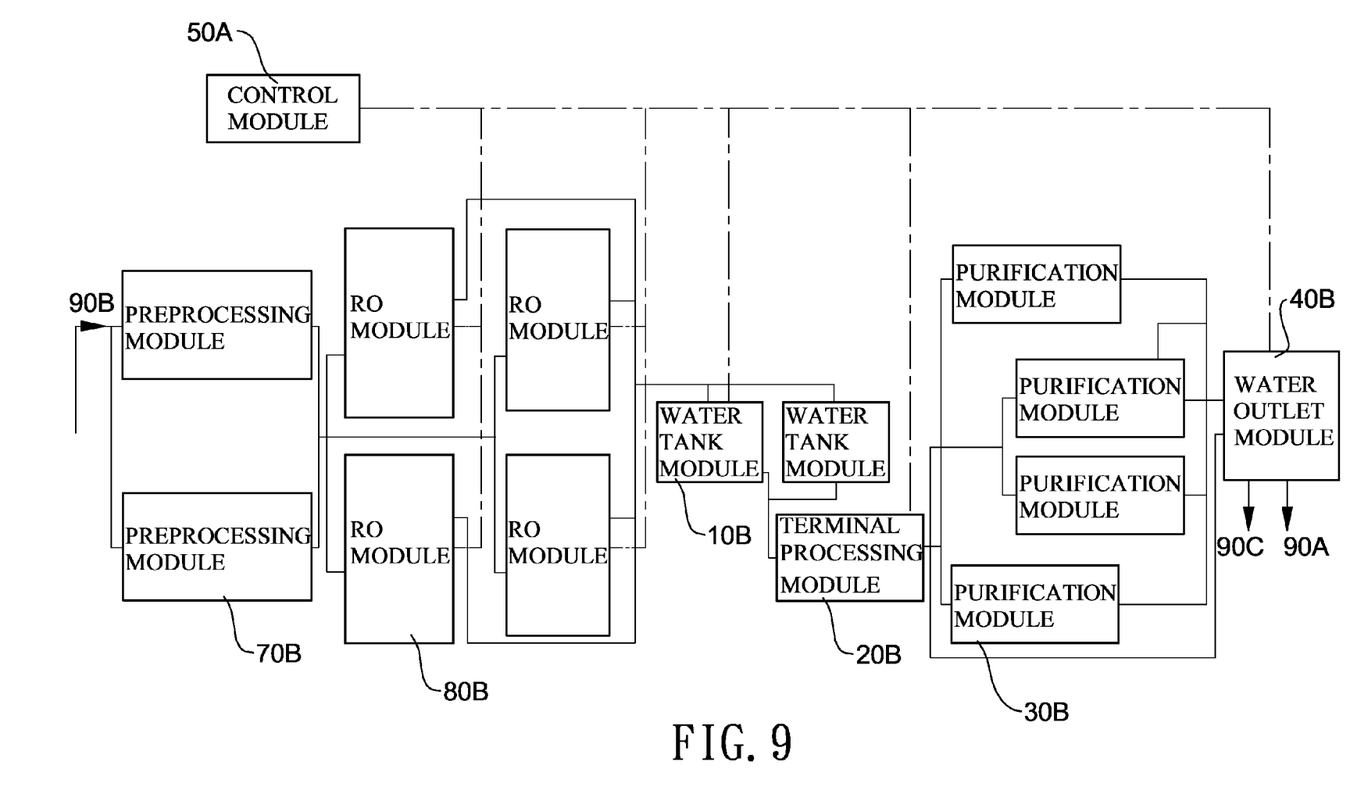
FIG. 9 is a flow diagram of the third arrangement of the stackable modular ultra pure water machine in FIG. 7.

With reference to FIGS. 7 to 9, a third arrangement of the ultra pure water machine is based on the second arrangement but has two water tank modules (10B). Therefore, the third arrangement of the ultra pure water machine allows more tap water (90B) to be stored to produce large amount of pure water (90C) or ultra pure water (90A).

The stackable modular ultra pure water machine in accordance with the present invention allows users to add or remove the modules to form the ultra pure water machines in different types and sizes for different requirements. Besides, when specific parts of the purifying elements are damaged and require to be repaired or replaced, workers only need to repair specific modules so that repair work is simpler and easier.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A stackable modular ultra pure water machine comprising:
    a seat equally divided into multiple square units arranged in a matrix, each unit having a same unit side-length;
    at least one water tank module mounted on the seat, each one of the at least one water tank module having a length, a width and a height, wherein the length of the water tank module is equal to or integer multiple of the unit side-length, the width of the water tank module is equal to or integer multiple of the unit side-length, and the height of the water tank module is equal to or integer multiple of the unit side-length;
    at least one terminal processing module connected to the at least one water tank module by a pipeline;
    at least one purification module connected to the at least one terminal processing module by a pipeline, each one of the at least one purification module having a length, a width and a height, wherein the length of the purification module is equal to or integer multiple of the unit side-length, the width of the purification module is equal to or integer multiple of the unit side-length, and the height of the purification module is equal to or integer multiple of the unit side-length;
    at least one water outlet module connected to the at least one purification module by a pipeline; and
    a control module connected to the water tank module, the terminal processing module and the water outlet module by circuits and having an LED display and a faceplate.

2. The stackable modular ultra pure water machine as claimed in claim 1 comprising one water tank module, one terminal processing module, two purification modules and one water outlet module.

3. The stackable modular ultra pure water machine as claimed in claim 1 further comprising:
    at least one pretreatment module, each one of the at least one pretreatment module having a length, a width and a height, wherein the length of the pretreatment module is equal to or integer multiple of the unit side-length, the width of the pretreatment module is equal to or integer multiple of the unit side-length, and the height of the pretreatment module is equal to or integer multiple of the unit side-length; and
    at least one RO module connected between the at least one pretreatment module and the at least one water tank module by pipelines, and connected to the control module by a circuit, each one of the at least one RO module having a length, a width and a height, wherein the length of the RO module is equal to or integer multiple of the unit side-length, the width of the RO module is equal to or integer multiple of the unit side-length, and the height of the RO module is equal to or integer multiple of the unit side-length.

4. The stackable modular ultra pure water machine as claimed in claim 3 comprising two pretreatment modules, four RO modules, one water tank module, one terminal processing module, four purification modules and one water outlet module.

5. The stackable modular ultra pure water machine as claimed in claim 3 comprising two pretreatment modules, four RO modules, two water tank modules, one terminal processing module, four purification modules and one water outlet module.

* * * * *